United States Patent [19]

Baumann et al.

[11] Patent Number: 5,908,055
[45] Date of Patent: Jun. 1, 1999

[54] METHOD AND DEVICE FOR DISPENSING DIFFERENT TYPES OF FUEL WITH A SINGLE FUEL DISPENSER

[75] Inventors: Gerd Baumann, Titz; Christoph Dahlmanns, Geilenkirchen; Josef Welters, Erkelenz, all of Germany

[73] Assignee: Scheidt & Bachmann, Mönchengladbach, Germany

[21] Appl. No.: 08/918,648

[22] Filed: Aug. 22, 1997

[30] Foreign Application Priority Data

Aug. 23, 1996 [EP] European Pat. Off. ............ 96113537
Jan. 7, 1997 [EP] European Pat. Off. ............ 97710002

[51] Int. Cl.[6] .................................................. B65B 31/00
[52] U.S. Cl. ................................ 141/59; 141/7; 141/100
[58] Field of Search ..................... 141/7, 59, 11, 141/100, 104, 290, 382, 383, 384, 386, 45; 222/26

[56] References Cited

U.S. PATENT DOCUMENTS

| | | |
|---|---|---|
| 2,663,325 | 12/1953 | Bede . |
| 3,590,890 | 7/1971 | Young . |
| 3,639,735 | 2/1972 | Bickford .................................... 222/26 |
| 4,260,183 | 4/1981 | Krupp . |
| 4,938,251 | 7/1990 | Furrow et al. . |
| 4,978,029 | 12/1990 | Furrow et al. ................................ 222/1 |
| 5,203,384 | 4/1993 | Hansen ...................................... 141/59 |
| 5,285,744 | 2/1994 | Grantham et al. ........................ 141/59 |
| 5,285,826 | 2/1994 | Sanders et al. . |
| 5,343,738 | 9/1994 | Skaggs . |
| 5,351,727 | 10/1994 | Sanders et al. ............................ 141/59 |
| 5,390,712 | 2/1995 | Parrish et al. ............................. 141/59 |
| 5,398,977 | 3/1995 | Berger et al. ......................... 285/133.1 |
| 5,513,681 | 5/1996 | Sanders et al. ............................ 141/59 |
| 5,520,228 | 5/1996 | Fink, Jr. et al. .......................... 141/59 |
| 5,575,629 | 11/1996 | Olson et al. ............................ 417/405 |
| 5,630,528 | 5/1997 | Nanaji ........................................ 222/1 |
| 5,636,667 | 6/1997 | Young et al. ............................. 141/59 |
| 5,720,325 | 2/1998 | Grantham ................................. 141/59 |

FOREIGN PATENT DOCUMENTS

| | | |
|---|---|---|
| 4917172 | 8/1972 | Australia . |
| 0080591 | 6/1983 | European Pat. Off. . |
| 0718535 | 6/1996 | European Pat. Off. . |
| 1065308 | 6/1952 | France . |
| 29502262 | 8/1995 | Germany . |
| 29614661 | 11/1996 | Germany . |
| 2290848 | 1/1996 | United Kingdom ........................ 9/18 |

Primary Examiner—David J. Walczak
Attorney, Agent, or Firm—Robert W. Becker & Associates

[57] ABSTRACT

A fuel dispenser for dispensing different types of fuel has a dispenser housing and a fuel pumping unit for each type of fuel to be dispensed mounted in the dispenser housing. A computer with a display unit is mounted in the dispenser housing. At least one fuel hose with a fuel nozzle is provided for dispensing at least two kinds of fuel with the same fuel hose.

33 Claims, 4 Drawing Sheets

METHOD AND DEVICE FOR DISPENSING DIFFERENT TYPES OF FUEL WITH A SINGLE FUEL DISPENSER

BACKGROUND OF THE INVENTION

The present invention relates to a device for dispensing different types of fuel from a single fuel dispenser with at least one fuel pumping unit comprised of a fuel pump and a flow meter as well as a computer with display unit. The fuel dispensing takes place via one or a plurality of fuel hoses. The invention relates also to a method for operating such a device.

In fuel dispensers known from practice it is necessary to provide for each type of fuel, for example, regular gasoline, premium unleaded, premium, diesel or low-sulfur diesel, a separate fuel hose because each fuel hose contains only one flow channel for the fuel via which the fuel, coming from the fuel supply line, is guided at each fuel dispenser to the fuel nozzle through which the customer can dispense the fuel of the fuel dispenser.

It is furthermore known in fuel dispensing devices with vapor return to return the vapors, displaced from the tank to be filled, simultaneously to the filling of the vehicle fuel tank via the flexible fuel hose into the underground tank. For this purpose, the fuel hose is comprised of two coaxially arranged hoses inserted into one another whereby the inner hose serves for returning the vapors exiting from the tank to be filled while the coaxially arranged outer hose guides the fuel. The use of a respective hose for each type of fuel is, on the one hand, very expensive and, on the other hand, requires a large amount of space when up to five fuel hoses are arranged adjacent to one another at each fuel dispenser.

It is therefore an object of the present invention to provide a dispensing system for fuels for a device of the aforementioned kind that is economical to produce and flexible. A further object of the invention is to provide a method for operating such a dispensing system which ensures a simple and safe activation of the system.

SUMMARY OF THE INVENTION

A fuel dispenser for dispensing different kinds of fuel according to the present invention is primarily characterized by:

A dispenser housing;
A fuel pumping unit for each type of fuel to be dispensed mounted in the dispenser housing;
A computer with a display unit mounted in the dispenser housing;
At least one fuel hose having a fuel nozzle for dispensing at least two types of fuel.

Advantageously, the fuel hose consists of a flexible material having arranged therein at least two separate flow channels. The flexible material is preferably rubber.

The flow channels include at least one vapor return channel and at least two fuel dispensing channels.

Each one of the flow channels has a constant cross-sectional area along the entire length of the fuel hose.

The cross-sectional area of the flow channels and the cross-sectional shape of the flow channels may differ from channel to channel.

The fuel hose has radial stays for separating the flow channels from one another.

The flexible material may include an embedded textile material (reinforcing fabric).

Advantageously, the fuel dispenser further comprises a first coupling having receiving bores and hose connectors, wherein the fuel pumping units each have a fuel supply line, and wherein the receiving bores of the first coupling receive the fuel supply lines and wherein the hose connectors are connected to the flow channels of the fuel hose.

The receiving bores have an inner thread and the fuel supply lines are threaded into the inner thread of the receiving openings.

Preferably, the hose connectors have a cross-sectional shape matching the cross-sectional shape of the flow channels.

The hose connectors have free ends and a conical shape tapering toward the free ends.

At least one of the hose connectors has circumferential ribs.

Preferably, the fuel dispenser further comprises a first connecting member having a first end and a second end, wherein the first coupling has a central bore and the first end of the first connecting member is received in one of the flow channels and the second end of the first connecting member is received in the central bore.

Advantageously, the first end of the first connecting member tapers conically.

Preferably, the second end of the first connecting member has a receiving bore for receiving one of the fuel supply lines or a vapor return line.

Advantageously the fuel dispenser further comprises at least one clamping element engaging the circumference of the fuel hose for securing the fuel hose at the first coupling.

The fuel dispenser may further comprise a second coupling connecting the fuel nozzle to the fuel hose, wherein the fuel nozzle has a rotary coupling and the second coupling has a groove for receiving the rotary coupling. The second coupling further has hose connectors received in the fuel hose.

The hose connectors of the second coupling have a cross-sectional shape matching a cross-sectional shape of the flow channels.

The hose connectors of the second coupling have free ends and a conical shape tapering toward the free ends.

At least one of the hose connectors of the second coupling has circumferential ribs.

The second coupling has separate flow channels converging into a single dispensing channel in the direction toward the fuel nozzle.

The converging zone between the separate flow channels of the second coupling and the single dispensing channel is embodied so as to cause minimal turbulence.

The converging zone tapers conically toward the fuel nozzle.

The fuel dispenser may further comprise a second connecting member having a first end and a second end, wherein the second coupling has a central bore and the fuel nozzle has a vapor return line. The first end of the second connecting member is connected to the vapor return line and the second end of the second connecting member is received in the central bore.

Advantageously, the fuel dispenser further comprises clamping elements engaging the circumference of the fuel hose for securing the fuel hose at the first and second couplings.

The clamping elements are preferably hose clamps.

The clamping elements may be clamping rings comprised of at least two ring segments.

At least one of the ring segments of each one of the clamping rings has inner circumferential ribs.

The first and second couplings have a groove and the ring segments are secured in the groove.

Expediently, the fuel dispenser further comprises a clamping member for securing the ring segments of the clamping ring at the fuel hose. The clamping member preferably engages the circumference of the ring segments.

The clamping member is preferably a hose clamp.

The present invention also relates to a method for operating a fuel dispenser of the kind disclosed above, wherein the fuel dispenser comprises a fuel selecting device for selecting a type of fuel. The method according to the present invention is primarily characterized by:

Monitoring activation of the fuel selecting device and removal of the fuel nozzle;

Comparing the selection of the type of fuel and the removed fuel nozzle;

Activating the fuel pumping unit.

Upon activation of the fuel selecting device before removal of the fuel nozzle, the type of fuel and the remove nozzle are checked in the step of comparing for a match and, in the step of activating, the fuel pumping unit is released only when the type of fuel and the nozzle match.

Upon removal of the fuel nozzle before activation of the fuel selecting device only that portion of the fuel selecting device is activated that matches the removed fuel nozzle.

Upon activation of the fuel selecting device before removal of the fuel nozzle the respective fuel nozzle is marked by an illuminated display.

According to the present invention, at least one fuel hose is provided for dispensing at least two different types of fuel via a fuel nozzle connected to the fuel hose. By providing the possibility of dispensing a plurality of types of fuel via one fuel hose and one fuel nozzle connected to the fuel hose, it is, for example, possible to dispense diesel and low-sulfur diesel via one fuel hose while fuels such as regular, unleaded premium, and premium gasoline are dispensed by another hose. A dispenser according to the present invention thus comprises only two fuel hoses even though five different types of fuel are dispensed. Of course, it is also possible to dispense all five types of fuel via one single fuel hose.

According to a preferred embodiment of the invention, the fuel hose for dispensing different types of fuel has at least two separate flow channels. By providing at the same time a plurality of flow channels within one fuel hose, it is possible to dispense simultaneously or sequentially different types of fuel with one single fuel hose and/or to return the vapors displaced from the fuel tank to be filled via the fuel hose into the underground tank. The fuel hose is comprised of a flexible material, especially a rubber material.

It is furthermore suggested that in the fuel hose for dispensing different types of fuel a plurality of fuel dispensing channels for fuel and at least one vapor return channel for returning vapors are provided. A fuel hose embodied as disclosed is especially suitable for dispensing simultaneously or sequentially different types of fuels through this hose and to return the vapors directly through the fuel hose into the underground tank. Each of the plurality of flow channels has advantageously a constant cross-sectional area along the entire length of the fuel hose. The cross-sectional areas and the cross-sectional shapes of the individual flow channels within the flexible material, however, can be designed differently for each channel. For example, it is possible to embody the flow channels with a round and/or ring segment-shaped contour.

The shape stability of such a fuel hose for the inventive device can be increased by providing radially extending stays between the individual flow channels for separating the individual flow channels whereby the stays are comprised of the same material as the fuel hose. For reinforcing the fuel hose, it is suggested that within the flexible material of the fuel hose a textile material (textile fabric) is embedded.

For connecting the fuel hose to the fuel supply lines within the fuel dispenser, a first coupling is provided which comprises receiving bores for connecting thereto the fuel supply lines as well as hose connectors for connecting the coupling to the fuel hose. This first coupling is the interface between the actual pumping unit(s) and the fuel hose. According to a preferred embodiment of this first coupling, the receiving bores for connecting thereto the fuel supply lines are provided with inner threads into which the fuel supply lines can be threaded. This embodiment allows in a simple manner a connection to the fuel supply lines that is easily mountable and easily sealable.

In order to provide for an easily mountable and easily sealable connection of the first coupling to the fuel hose, it is suggested that the cross-sections of the individual hose connectors are substantially embodied to match the cross-section of the fuel hose, respectively, its flow channels to which the coupling is to be connected. According to a preferred embodiment of the invention, the hose connectors of the first coupling are embodied so as to taper conically. This conical tapering of the hose connectors, on the one hand, allows for an easy insertion of the hose connectors into the respective flow channels of the fuel hose and, on the other hand, provides a safe sealing between the hose connectors and the fuel hose because due to the conical embodiment of the hose connectors the fuel hose is form-lockingly forced and pressed onto the hose connectors of the first coupling when completely inserted.

The secure mounting of the fuel hose on the hose connectors of the first coupling can inventively be improved when the exterior surface of at least one hose connector is provided with substantially circumferentially extending ribs. With this embodiment that in cross-section is sawtooth-shaped, an accidental sliding off of the fuel hose from the fuel connectors due to pulling forces acting on the fuel hose or due to increased interior pressure within the fuel hose can be substantially completely prevented.

Furthermore, it is suggested with the invention that the fuel hose is securable at the coupling with at least one clamping element engaging the circumference of the fuel hose.

According to a further advantageous embodiment of the invention, the first coupling is provided with a central bore into which a connecting member can be inserted especially for connecting thereto the vapor return line in a positive-locking manner, for example, by threading. In order to facilitate the introduction of the connecting member into the corresponding flow channel of the fuel hose and in order to ensure safe mounting of the fuel hose on the connecting member, the connecting member tapers conically in the direction toward the fuel hose. At the end of the connecting member opposite the fuel hose a receiving bore for connecting thereto a fuel supply line or a vapor return line is provided.

The fuel hose is connected to the fuel nozzle by a second coupling. This second coupling has a groove for receiving a rotary coupling of the fuel nozzle as well as hose connectors for insertion into the fuel hose. In order to ensure a simple and safely sealed contact of the second coupling with the fuel hose, the cross-sectional shapes of the individual hose connectors are substantially matched to the cross-sectional shapes of the fuel hose, respectively, its flow channels. For further facilitating mounting and for increasing the sealing effect, according to a preferred embodiment, the hose connectors of the second coupling taper conically. Due to this conical embodiment, the insertion of the hose connectors into the fuel hose results in a form-locking press fit between the hose connectors and the fuel hose.

The safety of the seat of the fuel hose on the hose connectors of the second coupling can be further improved by providing the exterior surfaces of at least one hose connector with substantially circumferentially extending ribs. With this embodiment of the ribs, which in cross-sectional view are substantially sawtooth-shaped, the seat of the fuel hose on the hose connectors is substantially improved so that the risk accidentally pulling the fuel hose off the hose connectors is minimized.

At the side of the coupling facing the fuel nozzle, the individual flow channels within the hose connectors converge into a single dispensing channel. In order to ensure a uniform fuel flow from the fuel hose into the fuel nozzle, the converging zone from the hose connectors to the common (single) dispensing channel is embodied such that turbulence is minimized. Especially, the converging zone tapers conically in the direction toward the fuel nozzle.

According to an advantageous embodiment of the invention the second coupling is provided with a central bore which may receive the connecting member for contacting the vapor return line of the fuel nozzle in a force-locking manner (frictional connection).

Furthermore, the invention suggests that the fuel hose is secured at the second coupling with at least one clamping element engaging the circumference of the fuel hose.

The clamping elements engaging the circumference of the fuel hose for securing the fuel hose at the first and/or second coupling are preferably provided in the form of hose clamps.

According to a second embodiment, the clamping elements are in the form of clamping rings comprised of at least two ring segments which are securable in grooves provided at the couplings.

An especially safe seat of the clamping elements on the fuel hose, when embodied in the form of ring segments, can be achieved when the inner surface of at least one ring segment of the clamping element is provided with circumferential ribs.

It is furthermore suggested with the present invention that the ring segments can be secured at the fuel hose with clamping members, for example, in the form of hose clamps, engaging the circumference of the ring segments.

The inventive solution for operating a device of the aforementioned kind for dispensing different types of fuels with a single fuel dispenser according to the present invention is characterized in that a fuel selecting device for selecting the respective type of fuel is provided and that the following method steps are included:

a) Monitoring activation of the fuel selecting device and removal of the fuel nozzle;
  b) Comparing selection of the type of fuel and the removed fuel nozzle; and
  c) Activation of the respective fuel pumping unit.

In order to ensure that upon actuation of the fuel selecting device before the removal of the fuel nozzle only that one of the fuel pumping units can be actuated which coincides with the selected type of fuel, it is inventively suggested that the fuel type selection and the selection of the fuel nozzle are checked with regard to matching and, only when the two match, dispensing of fuel is possible by releasing (activating) the respective fuel pumping unit.

The removal of the correct fuel nozzle upon actuation of the fuel selecting device before removal of the fuel nozzle can be facilitated by providing an illuminated display that indicates the correct (matching) fuel nozzle. Furthermore, it is suggested with the invention that upon removal of the fuel nozzle before actuation of the fuel selecting device only the portion of the selecting device corresponding to the correct fuel for the selected fuel nozzle can be activated so that in this manner it is ensured that for a wrong selection, i.e., the actuation of the fuel selecting device after removal of the fuel nozzle only such fuel types can be selected which can be dispensed by the fuel nozzle.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5b.

Figure 1:
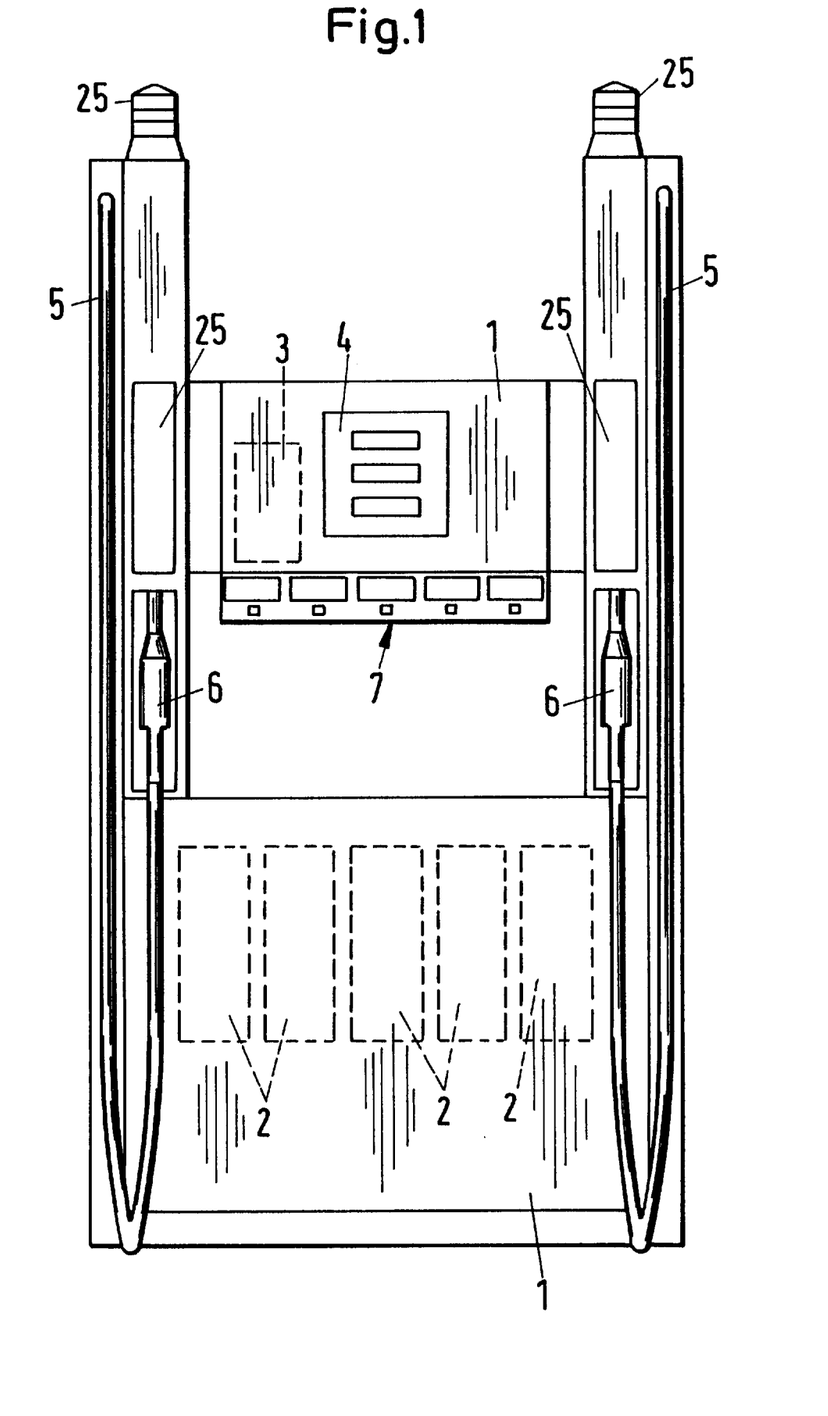
FIG. 1 is a schematic front view of the inventively designed fuel dispenser.

FIG. 1 shows in a schematic view a dispenser for dispensing five types of fuel. For pumping and dispensing the fuels, a fuel pumping unit 2 for each fuel is arranged in the lower portion of the dispenser housing 1. In the shown embodiment, unit 2 is comprised of a fuel pump, a flow meter and an impulse sender. Of course, it is also possible to provide, for example, only an impulse sender for each fuel dispenser and/or to arrange the fuel pump external to the housing 1, for example, at or within the underground storage tank. For determining the amount of fuel dispensed and for calculating the price to be charged, the upper portion of the housing 1 is provided with a computer 3. The display unit 4 is also arranged within the upper portion of the housing 1 which informs the operator of the fuel dispenser in regard to the dispensed amount of fuel, the price per liter or gallon of fuel, as well as the total price for the dispensed fuel.

A special design feature of such a fuel dispenser is that the fuel dispenser comprises only two fuel hoses 5 with a respectively connected fuel nozzle 6 even though the fuel dispenser is able to dispense up to five types of fuel. The represented embodiment of a fuel dispenser is, for example, designed to dispense regular gasoline, unleaded premium gasoline, premium gasoline, diesel fuel, and low-sulfur diesel fuel. One of the two fuel hoses 5 is then designated for dispensing the two types of diesel fuels and the other fuel hose is designed for dispensing the three gasoline and premium gasoline fuels. The selection of the fuel to be dispensed is made with the fuel selecting device 7 arranged within the display unit 4 via which the different types of fuel can be individually selected.

In order to ensure that for a fuel dispenser of this type mixing of the individual type of fuels is impossible within the fuel hose 5, the fuel hoses 5 are provided with a plurality of separate flow channels 8.

Figure 2:
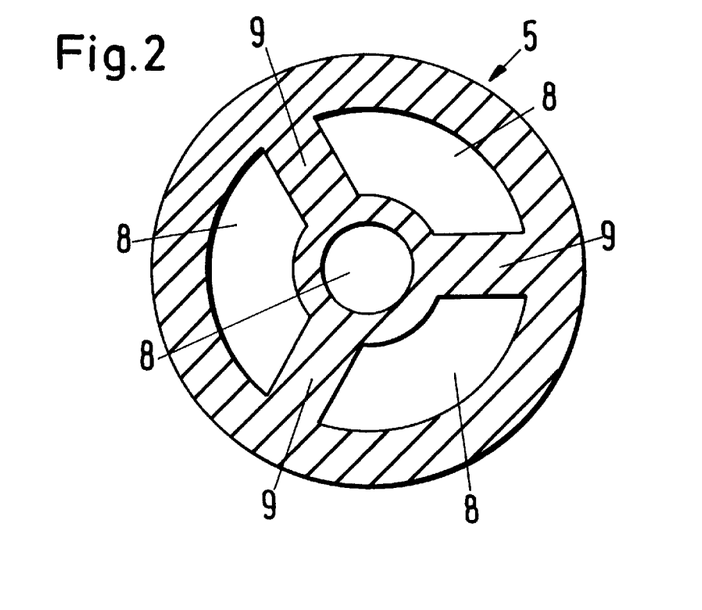
FIG. 2 shows a cross-section of one embodiment of a fuel hose for dispensing a plurality of fuels.

In the embodiment of such a fuel hose 5 represented in FIG. 2, four flow channels 8 are arranged within the fuel hose 5. In the shown embodiment, the center of the fuel hose has a round flow channel 8 which is surrounded coaxially by three ring-segment-shaped flow channels 8. In practice, a fuel hose 5 embodied such can be, for example, used such that via the three ring-segment-shaped flow channels 8 different fuels, for example, regular gasoline, premium unleaded gasoline and premium gasoline can be supplied, while through the centrally arranged flow channel 8 vapors are returned to a non-represented underground storage tank. In the shown embodiment, the individual ring-segment-shaped flow channels 8 are separated by the radially extending stays 9. In addition to the separation of the individual flow channels 8, the stays 9 provide for increased stability of such a fuel hose 5 in addition to the type of material used as the flexible material, for example, a rubber material. Furthermore, the stability of the fuel hose 5 can be increased by embedding a textile material (textile fabric) into the flexible material of the fuel hose 5.

Figure 3:
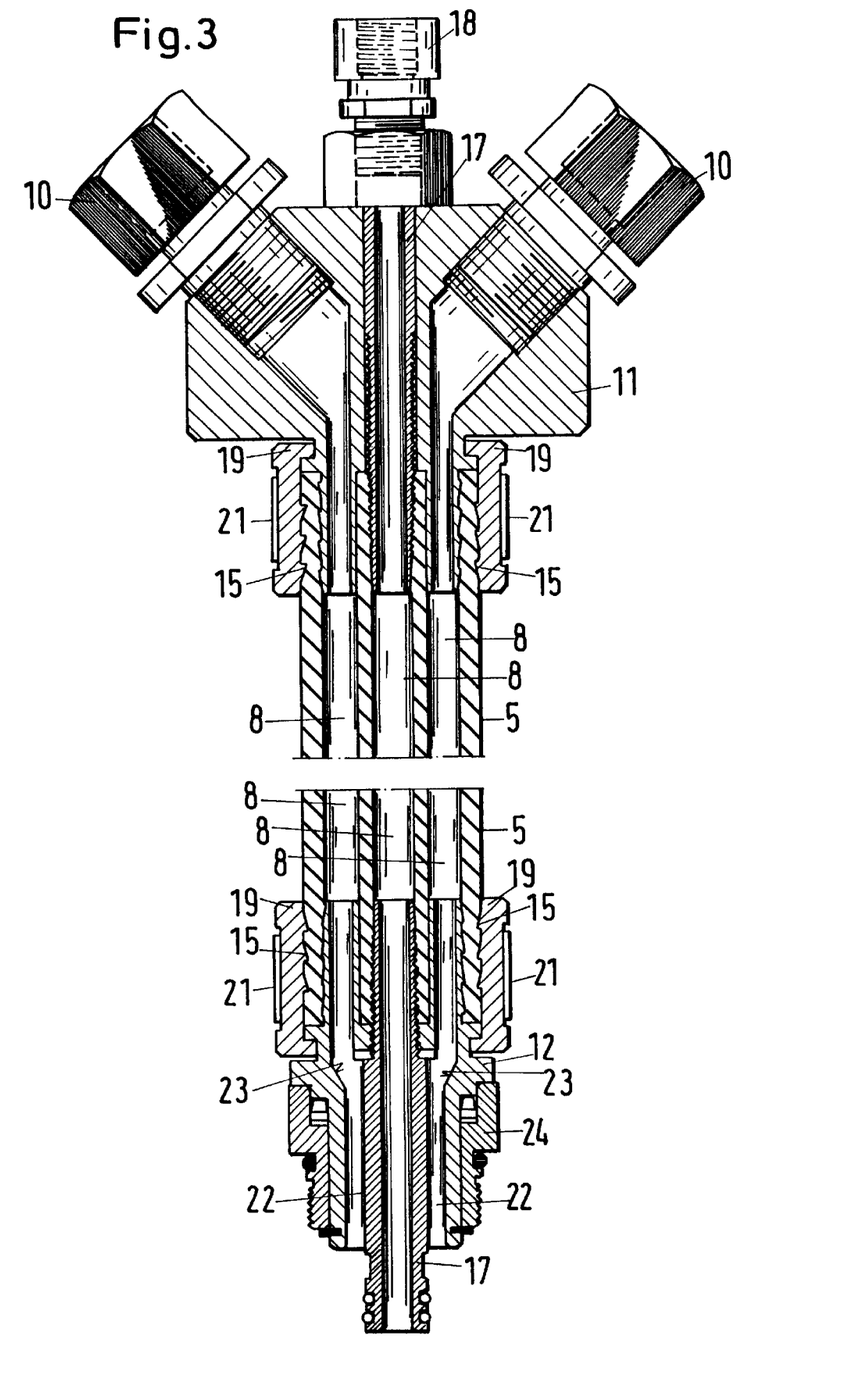
FIG. 3 shows a longitudinal section of a schematic representation of a fuel hose with first and second coupling connected thereto for contacting therewith the fuel supply lines and the fuel nozzle, respectively.

The connection of the respective ends of the fuel hoses 5 represented in FIG. 1 to the fuel supply lines 10 within the fuel dispenser and to the fuel nozzle 6 is achieved with a first coupling 11 and a second coupling 12, represented schematically in FIG. 3. Details of the first coupling 11 can be taken from FIGS. 4a through 4c, and details of the second coupling 12 can be taken from FIGS. 5a and 5b.

For connecting the fuel hose 5 to the fuel supply lines 10 within the fuel dispenser, the first coupling 11 has receiving bores 13 into which the fuel supply lines 10 are threaded in the shown embodiment. The connection with the fuel hose 5 is realized via hose connectors 14 provided at the underside of the first coupling 11. As can be seen especially in FIG. 4c, they are matched in their cross-sectional shape to the cross-sectional shape of the flow channels 8 provided within the fuel hose 5. As can be seen in FIG. 3, the fuel hose 5 is slipped onto the hose connectors 14 such that the hose connectors 14 engage the flow channels 8. In order to provide for easy insertion of the hose connectors 14 into the fuel hose 5 and, on the other hand, to ensure fast and tight attachment of the fuel hose 5 to the hose connectors 14, the hose connectors 14 are embodied so as to conically taper in a direction away from the coupling member 11. In the represented embodiment of the first coupling 11, the outer surfaces of the hose connectors 14 are provided with circumferential ribs 15 having in cross-section a sawtooth-shaped appearance which counteract the removal of the fuel hose 5 from the hose connectors 14.

Figure 4A:
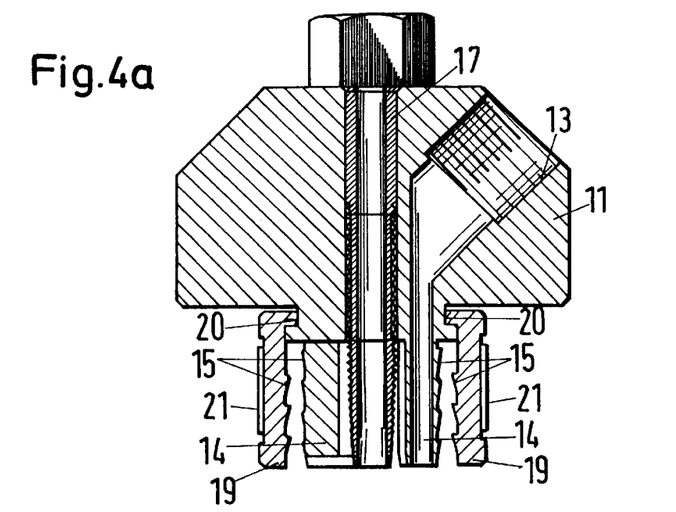
FIG. 4a shows a longitudinal section of the first coupling.
Figure 4B:
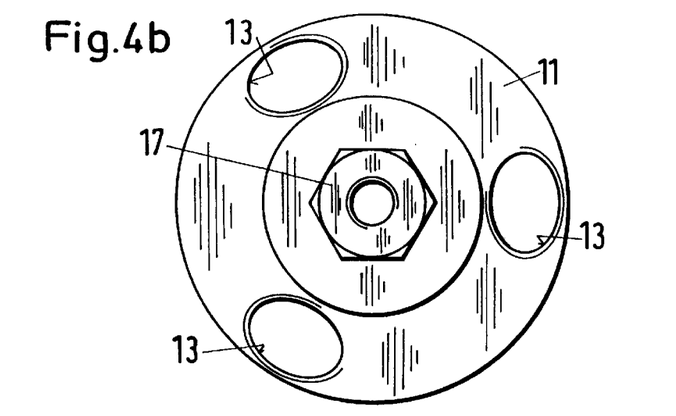
FIG. 4b shows a plan view of the first coupling.
Figure 4C:
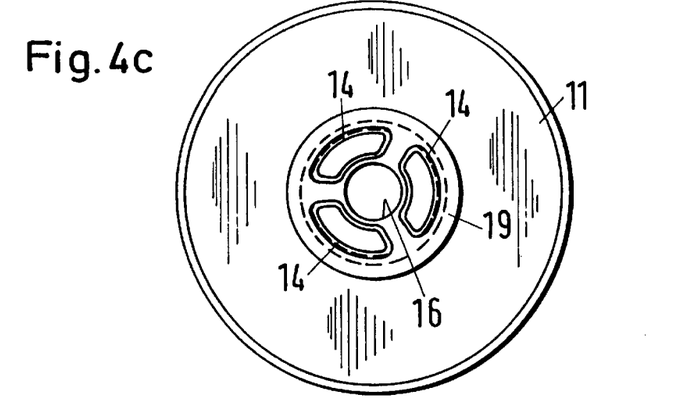
FIG. 4c shows a bottom view of the first coupling.

As can be seen especially in FIGS. 3 and 4a, the first coupling 11 has a central bore 16 which can be form-lockingly (positive-lockingly) inserted into the connecting member 17 by threading. In the shown embodiment the connecting member 17 provides the connection to a vapor return line 18 of the fuel dispenser. The portion of the connecting member 17 to be inserted into the fuel hose 5 tapers conically, similar to the hose connectors 14, toward the fuel hose 5. As can be seen in FIG. 3, the fastening of the fuel hose 5 onto the hose connectors 14 is improved when the connecting member 17 is threaded into the central bore 16 of the first coupling 11 after the fuel hose 5 has been slipped onto the hose connectors 14. By embodying the connecting members 17 so as to conically taper, the inner area of the fuel hose 15 is forced apart and pressed between the inwardly located external surfaces of the hose connectors 14.

In addition to this clamping action between the fuel hose 5 and the hose connectors 14 as well as the embodiment of the ribs 15 at the exterior surface of the hose connectors 14, securing of the fuel hose 5 at the first coupling 11 can further be improved by providing a clamping element 19 that engages the circumference of the fuel hose 5, as shown in FIGS. 3 and 4a. In the shown embodiment, the clamping element 19 engages a groove 20 provided at the first coupling 11 and is further secured by a clamping member 21 surrounding additionally the clamping element 19. The clamping member 21 may be in the form of a hose clamp. At the inner side of the clamping element 19 a rib design matching the rib design 15 of the hose connectors 14 is provided through which the removal of the fuel hose 5 from the hose connectors 14 is made even more difficult.

In the shown embodiment of the first coupling 11 the three receiving bores 13 for connection to the fuel supply lines 10 as well as the central bore 16 are provided, whereby the bore 16 may receive a connecting member 17 for the vapor return line 18. When it is desired to connect fewer fuel supply lines 10, the receiving bores 13 which are not to be used can be closed off by non-represented plugs.

Figure 5A:
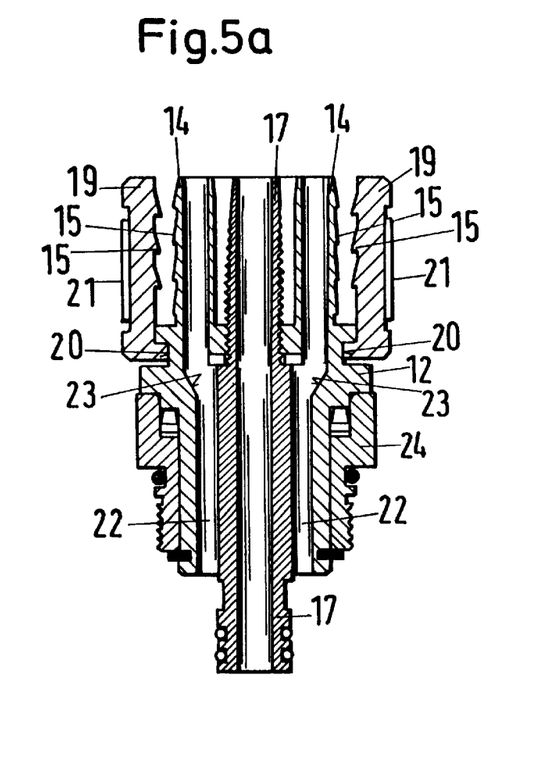
FIG. 5a shows a longitudinal section of the second coupling.
Figure 5B:
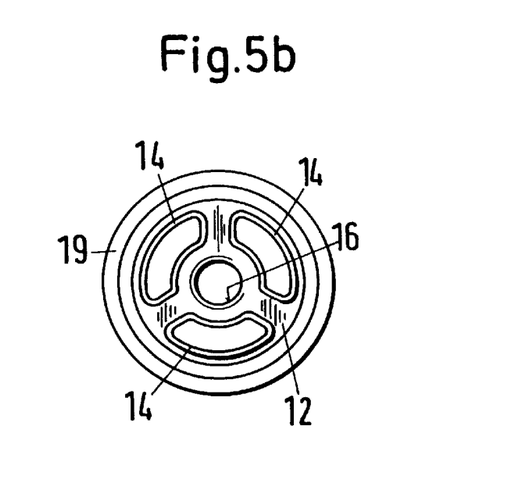
FIG. 5b shows a plan view of the second coupling.

The second coupling 12, connecting the fuel hose 5 and the fuel nozzle 6, is designed similarly to the coupling 11. For contacting the flow channels 8 of the fuel hose 5, the second coupling 12 comprises hose connectors 14 which taper conically in the direction of the fuel hose 5. Their outer surface of which is provided with a sawtooth-shaped rib structure for increasing the clamping action of the fuel hose 5 on the hose connectors 14. In the represented embodiment of the second coupling 12, in similar fashion as in respect to the first coupling 11, a clamping element 19 is provided that engages the outer circumference of the fuel hose 5 and is insertable into a groove 20 of the second coupling 12, whereby additionally a clamping member 21 is provided that surrounds the clamping element 19.

As can be seen especially from FIGS. 3 and 5a, the flow channels 8 provided for transporting the fuel to the fuel nozzle 6 have a converging zone into a single dispensing channel 22. The converging zone 23 between the individual flow channels 8 and the single dispensing channel 22 is such that only minimal turbulence is created. Preferably, it is embodied in a conical design in order to provide for a uniform fuel flow from the fuel hose 5 into the fuel nozzle 6.

The second coupling member 12 also comprises a central bore 16 for receiving a connecting member 17. The connecting member 17 facing the fuel nozzle 6 provides a connection to the non-represented vapor return line of the nozzle 6. In order to facilitate the drawings, in the representations of FIGS. 3 and 5a the fuel nozzle 6 is not represented, but only the rotary coupling 24 for connecting the fuel nozzle 6.

With a fuel dispenser of this type it is thus possible to dispense with only two fuel hoses 5 five different types of fuel without having to provide a separate fuel hose 5 for each individual type of fuel.

The function of such a device is explained in the following.

In the operation of the fuel dispenser, in principle, two different operational states must be differentiated. This refers to the preselection and the post-selection of the fuel type via the fuel selecting device 7. Preselection refers to the operator of the fuel dispenser selecting via the fuel selecting device the desired type of fuel before removing the fuel nozzle 6. After activation of the selecting device 7, a display 25 may indicate to the operator which of the fuel hoses 5 and which fuel nozzle 6 correspond to the selected fuel. After removal of the fuel nozzle 6 the computer 3 of the fuel dispenser performs a comparison for checking whether the selected fuel type and the removed fuel nozzle 6 match. Only when a positive result is obtained, the fuel pumping unit 2 for the respective selected fuel is released or activated by the computer.

The so-called post-selection is defined as the operator removing the fuel nozzle 6 before activating the fuel selecting device 7 for selecting a desired fuel. When this operational situation occurs, after removal of the fuel nozzle 6 the computer 3 will activate only those portions of the selecting device 7 which allow dispensing of the selected fuel via the fuel hose 5. This operational mode ensures that the fuel selection and selection of the fuel nozzle 6, respectively, the fuel hose 5 will always coincide, respectively, that, when the nozzle 6 and the selected fuel do not match, no fuel will be dispensed.

The present invention is, of course, in no way restricted to the specific disclosure of the specification and drawings, but also encompasses any modifications within the scope of the appended claims.

What we claim is:

1. A fuel dispenser for dispensing different types of fuel, said dispenser comprising:
    a dispenser housing;
    a fuel pumping unit for each type of fuel to be dispensed mounted in said dispenser housing;
    each fuel pumping unit having a flow meter and a fuel supply line;
    a computer with a display unit mounted in said dispenser housing;
    at least one fuel hose having a first and a second end and comprising at least two fuel dispensing channels and at least one vapor return channel for dispensing at least two types of fuel;
    a first coupling having a central bore and receiving bores for receiving said fuel supply lines;
    a first connecting member having a first end and a second end, said first end of said first connecting member connected to said first end of said fuel hose and said second end of said first connecting member received in said central bore of said first coupling;
    a second coupling having hose connectors connected to said second end of in said fuel hose;
    said second coupling having separate flow channels matching said fuel dispensing channels of said fuel hose and converging into a single dispensing channel in a fuel dispensing direction;
    said second coupling having a central bore;
    a fuel nozzle for dispensing fuel, said fuel nozzle having a vapor return line;
    a second connecting member having a first end and a second end;
    said first end of said second connecting member connected to said vapor return line and said second end of said second connecting member received in said central bore of said second coupling.

2. A fuel dispenser according to claim 1, wherein said fuel hose consists of a flexible material.

3. A fuel dispenser according to claim 2, wherein said flexible material is rubber.

4. A fuel dispenser according to claim 2, wherein each one of said flow channels has a constant cross-sectional area along the entire length of said fuel hose.

5. A fuel dispenser according to claim 2, wherein a cross-sectional area of said flow channels and a cross-sectional shape of said flow channels differ.

6. A fuel dispenser according to claim 2, wherein said fuel hose has radial stays for separating said flow channels from one another.

7. A fuel dispenser according to claim 2, wherein said flexible material includes an embedded textile material.

8. A fuel dispenser according to claim 2, wherein said hose connectors are connected to said flow channels of said fuel hose.

9. A fuel dispenser according to claim 8, wherein said receiving bores have an inner thread and wherein said fuel supply lines are threaded into said inner threads of said receiving openings.

10. A fuel dispenser according to claim 8, wherein said hose connectors have a cross-sectional shape matching a cross sectional shape of said flow channels.

11. A fuel dispenser according to claim 10, wherein said hose connectors have free ends and a conical shape tapering toward said free ends.

12. A fuel dispenser according to claim 8, wherein at least one of said hose connectors has circumferential ribs.

13. A fuel dispenser according to claim 8, wherein said first end of said first connecting member is received in one of said flow channels.

14. A fuel dispenser according to claim 13, wherein said first end of said first connecting member tapers conically.

15. A fuel dispenser according to claim 13, wherein said second end of said first connecting member has a receiving bore for receiving a vapor return line of said fuel dispenser.

16. A fuel dispenser according to claim 8, further comprising at least one clamping element engaging a circumference of said fuel hose for securing said fuel hose at said first coupling.

17. A fuel dispenser according to claim 8, wherein said fuel nozzle has a rotary coupling and said second coupling has a groove for receiving said rotary coupling.

18. A fuel dispenser according to claim 17, further comprising clamping elements engaging a circumference of said fuel hose for securing said fuel hose at said first and second couplings.

19. A fuel dispenser according to claim 18, wherein said clamping elements are hose clamps.

20. A fuel dispenser according to claim 18, wherein said clamping elements are clamping rings comprised of at least two ring segments.

21. A fuel dispenser according to claim 20, wherein at least one of said ring segments of each one of said clamping rings has inner circumferential ribs.

22. A fuel dispenser according to claim 20, wherein said first and second couplings have a groove and wherein said ring segments are secured in said groove.

23. A fuel dispenser according to claim 20, further comprising a clamping member for securing said ring segments of said clamping ring at said fuel hose, wherein said clamping member engages a circumference of said ring segments.

24. A fuel dispenser according to claim 23, wherein said clamping member is a hose clamp.

25. A fuel dispenser according to claim 17, wherein said hose connectors of said second coupling have a cross-sectional shape matching a cross-sectional shape of said flow channels.

26. A fuel dispenser according to claim 17, wherein said hose connectors of said second coupling have free ends and a conical shape tapering toward said free ends.

27. A fuel dispenser according to claim 17, wherein at least one of said hose connectors of said second coupling has circumferential ribs.

28. A fuel dispenser according to claim 1, wherein a converging zone between said separate flow channels of said second coupling and said single dispensing channel is embodied so as to cause minimal turbulence.

29. A fuel dispenser according to claim 28, wherein said converging zone tapers conically toward said fuel nozzle.

30. A method for operating a fuel dispenser according to claim 1, wherein the fuel dispenser comprises a fuel selecting device for selecting a type of fuel and wherein at least two fuel hoses are provided, said method comprising the steps of:

monitoring activation of the fuel selecting device and removal of the fuel nozzle;

comparing the selection of the type of fuel and the removed nozzle;

activating the fuel pumping unit for the selected type of fuel.

31. A method according to claim 30, wherein upon activation of the fuel selecting device before removal of the fuel nozzle in the step of comparing the type of fuel and the removed nozzle are checked for a match and wherein in the step of activating the fuel pumping unit is released only when the type of fuel and the nozzle match.

32. A method according to claim 30, wherein upon removal of the fuel nozzle before activation of the fuel selecting device only a portion of the fuel selecting device is activated that matches the removed fuel nozzle.

33. A method according to claim 30 wherein upon activation of the fuel selecting device before removal of the fuel nozzle the respective fuel nozzle is marked by an illuminated display.

* * * * *